US011696241B2

United States Patent
Gulati et al.

(10) Patent No.: US 11,696,241 B2
(45) Date of Patent: Jul. 4, 2023

(54) TECHNIQUES FOR SYNCHRONIZING BASED ON SIDELINK SYNCHRONIZATION SIGNAL PRIORITIZATION

(71) Applicant: QUALCOMM Incorporated, San Diego, CA (US)

(72) Inventors: Kapil Gulati, Hillsborough, NJ (US); Sudhir Kumar Baghel, Hillsborough, NJ (US); Junyi Li, Chester, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 16/942,365

(22) Filed: Jul. 29, 2020

(65) Prior Publication Data

US 2021/0037493 A1 Feb. 4, 2021

Related U.S. Application Data

(60) Provisional application No. 62/880,480, filed on Jul. 30, 2019.

(51) Int. Cl.
*H04W 56/00* (2009.01)
*H04B 17/318* (2015.01)

(52) U.S. Cl.
CPC ...... *H04W 56/0005* (2013.01); *H04B 17/318* (2015.01)

(58) Field of Classification Search
CPC . H04W 4/40; H04W 56/001; H04W 72/0406; H04W 4/46; H04W 4/44; H04W 4/42
See application file for complete search history.

(56) References Cited

U.S. PATENT DOCUMENTS

| 2015/0124579 A1* | 5/2015 | Sartori | H04W 4/70 370/337 |
| 2016/0174179 A1* | 6/2016 | Seo | H04W 76/23 370/350 |

(Continued)

FOREIGN PATENT DOCUMENTS

| EP | 3355628 A1 | 8/2018 |
| WO | WO-2018151644 A1 | 8/2018 |

OTHER PUBLICATIONS

International Search Report and Written Opinion—PCT/US2020/044215—ISA/EPO—dated Nov. 13, 2020.

(Continued)

*Primary Examiner* — Khalid W Shaheed
(74) *Attorney, Agent, or Firm* — Dalei Dong; Holland & Hart LLP

(57) ABSTRACT

Methods, systems, and devices for wireless communications are described. A user equipment (UE) may receive a first set of synchronization signals from a first synchronization source and may receive a second set synchronization signals from a second synchronization source, where the UE determines a first priority for the first synchronization source based on a first identification (ID) associated with the first set of synchronization signals and a second priority for the second synchronization source based on a second ID associated with the second set of synchronization signals. Accordingly, the UE may then select the first synchronization source or the second synchronization source based on which synchronization source has a higher priority and communicate with the selected synchronization source (e.g., via sidelink communications).

30 Claims, 12 Drawing Sheets

(56) References Cited

U.S. PATENT DOCUMENTS

2018/0234928 A1*   8/2018  Yasukawa .............. H04W 92/18
2018/0352525 A1*  12/2018  Li ...................... H04B 7/18528
2019/0174444 A1*   6/2019  Li ...................... H04W 56/0015
2019/0200309 A1*   6/2019  Zeng .................. H04W 88/023

OTHER PUBLICATIONS

Mitsubishi Electric: "On Synchronization Procedures for NR V2X Sidelink", 3GPP Draft, R1-1907025-RAN1#97-V2X Sync Mitsubishi, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728473, 6 pages, Retrieved from the Internet: URL: http://www.3gpp.org/ftp/Meetings%5F3GPP%5FSYNC/RAN1/Docs/R1%2D1907025%2Ezip. [retrieved on May 13, 2019] the whole document.

\* cited by examiner

TECHNIQUES FOR SYNCHRONIZING BASED ON SIDELINK SYNCHRONIZATION SIGNAL PRIORITIZATION

CROSS REFERENCE

The present application for patent claims the benefit of U.S. Provisional Patent Application No. 62/880,480 by GULATI et al., entitled "TECHNIQUES FOR SYNCHRONIZING BASED ON SIDELINK SYNCHRONIZATION SIGNAL PRIORITIZATION," filed Jul. 30, 2019, assigned to the assignee hereof, and which is hereby incorporated by reference in its entirety.

FIELD OF DISCLOSURE

The present disclosure, for example, relates to wireless communications systems, more specifically to techniques for synchronizing based on sidelink synchronization signal prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, a UE may synchronize with a synchronous source (e.g., a synchronization source) prior to communicating with the synchronous source. However, the UE may receive synchronization signals from multiple synchronous sources, thereby impacting the ability of the UE to determine with which synchronous source to synchronize and, subsequently, communicate.

SUMMARY

The described techniques relate to improved methods, systems, devices, and apparatuses that support techniques for synchronizing based on sidelink synchronization signal prioritization. For example, the described techniques provide for a user equipment (UE) to receive a first set of synchronization signals from a first synchronous or synchronization source (e.g., a first UE) and to receive a second set synchronization signals from a second synchronous or synchronization source (e.g., a second UE), where the UE determines a first priority for the first synchronous source based on a first identification (ID) associated with the first set of synchronization signals and a second priority for the second synchronous source based on a second ID associated with the second set of synchronization signals (e.g., lower IDs correspond to a higher priority). Accordingly, the UE may then select the first synchronous source or the second synchronous source based on which synchronous source has a higher priority and communicate with the selected synchronous source (e.g., via sidelink communications).

In some cases, the first synchronous source and the second synchronous source may be part of a first set of synchronous sources that are independent of a global navigation satellite system (GNSS) (e.g., out-of-coverage of the GNSS system, not connected to a base station, etc.). Additionally, the UE may determine a first power measurement (e.g., reference signal received power (RSRP) measurement) for the first set of synchronization signals and a second power measurement for the second set of synchronization signals, where selecting the first synchronous source or the second synchronous source is based on the first power measurement and the second power measurement.

A method of wireless communications at a UE is described. The method may include receiving a first configuration from a first synchronization source, the first configuration including a first synchronization source ID associated with the first synchronization source, receiving a second configuration from a second synchronization source, the second configuration including a second synchronization source ID associated with the second synchronization source, identifying the first synchronization source ID and the second synchronization source ID are from a first set of synchronization source IDs associated with independent synchronization sources, determining a first priority for the first synchronization source based on the first synchronization source ID and a second priority for the second synchronization source based on the second synchronization source ID, selecting the first synchronization source based on the first priority being higher than the second priority, and communicating with one or more devices using synchronization information associated with the selected first synchronization source as a synchronization reference. In some examples, the one or more devices may include the first synchronous source, the second synchronous source, both the first synchronous source and the second synchronous source, or neither the first synchronous source nor the second synchronous source (e.g., an additional device).

An apparatus for wireless communications at a UE is described. The apparatus may include a processor, memory coupled with the processor, and instructions stored in the memory. The instructions may be executable by the processor to cause the apparatus to receive a first configuration from a first synchronization source, the first configuration including a first synchronization source ID associated with the first synchronization source, receive a second configuration from a second synchronization source, the second configuration including a second synchronization source ID associated with the second synchronization source, identify the first synchronization source ID and the second synchronization source ID are from a first set of synchronization source IDs associated with independent synchronization sources, determine a first priority for the first synchronization source based on the first synchronization source ID and a second priority for the second synchronization source based on the second synchronization source ID, select the first synchronization source based on the first priority being higher than the second priority, and communicate with one or more devices using synchronization information associated with the selected first synchronization source as a synchronization reference.

Another apparatus for wireless communications at a UE is described. The apparatus may include means for receiving a first configuration from a first synchronization source, the first configuration including a first synchronization source ID associated with the first synchronization source, receiving a second configuration from a second synchronization source, the second configuration including a second synchronization source ID associated with the second synchronization source, identifying the first synchronization source ID and the second synchronization source ID are from a first set of synchronization source IDs associated with independent synchronization sources, determining a first priority for the first synchronization source based on the first synchronization source ID and a second priority for the second synchronization source based on the second synchronization source ID, selecting the first synchronization source based on the first priority being higher than the second priority, and communicating with one or more devices using synchronization information associated with the selected first synchronization source as a synchronization reference.

A non-transitory computer-readable medium storing code for wireless communications at a UE is described. The code may include instructions executable by a processor to receive a first configuration from a first synchronization source, the first configuration including a first synchronization source ID associated with the first synchronization source, receive a second configuration from a second synchronization source, the second configuration including a second synchronization source ID associated with the second synchronization source, identify the first synchronization source ID and the second synchronization source ID are from a first set of synchronization source IDs associated with independent synchronization sources, determine a first priority for the first synchronization source based on the first synchronization source ID and a second priority for the second synchronization source based on the second synchronization source ID, select the first synchronization source based on the first priority being higher than the second priority, and communicate with one or more devices using synchronization information associated with the selected first synchronization source as a synchronization reference.

Some examples of the method, apparatuses, and non-transitory computer-readable medium described herein may further include operations, features, means, or instructions for determining a first RSRP measurement for the first synchronization source and a second RSRP for the second synchronization source, where the first synchronization source may be selected based on the first RSRP measurements.

Some examples of the method, apparatuses, and non-transitory computer-readable medium described herein may further include operations, features, means, or instructions for receiving the second configuration from the second synchronization source, identifying the second synchronization source ID may have a higher priority than the first synchronization source ID, and transitioning communications with the one or more devices from using the synchronization information associated with the selected first synchronization source to using synchronization information associated with the second synchronization source based at least in part on the higher priority of the second synchronization source ID.

Some examples of the method, apparatuses, and non-transitory computer-readable medium described herein may further include operations, features, means, or instructions for identifying a third synchronization source including a third synchronization source ID, the third synchronization source ID being from a second set of synchronization source IDs associated with a higher priority than the first set of synchronization source IDs, and communicating with the one or more devices using synchronization information associated with the third synchronization source based on the second set of synchronization source IDs having the higher priority than the first set of synchronization source IDs.

In some examples of the method, apparatuses, and non-transitory computer-readable medium described herein, the second set of synchronization source IDs may be associated with a GNSS coverage.

In some examples of the method, apparatuses, and non-transitory computer-readable medium described herein, the independent synchronization sources associated with the first set of synchronization source IDs include synchronization sources out of a GNSS coverage, not connected to a base station, independent of the synchronization reference, or a combination thereof.

In some examples of the method, apparatuses, and non-transitory computer-readable medium described herein, the first priority may be higher than the second priority based on the first synchronization source ID being lower than the second synchronization source ID.

In some examples of the method, apparatuses, and non-transitory computer-readable medium described herein where the first synchronization source ID has a same value as the second synchronization source ID, the method, apparatuses, and non-transitory computer-readable medium may further include operations, features, means, or instructions for determining a first RSRP measurement for the first synchronization source and a second RSRP measurement for the second synchronization source, where the first synchronization source may be selected based on the first RSRP measurement.

In some examples of the method, apparatuses, and non-transitory computer-readable medium described herein, the first priority and the second priority may be determined based on priority groups within the first set of synchronization source IDs associated with the independent synchronization sources.

Some examples of the method, apparatuses, and non-transitory computer-readable medium described herein may further include operations, features, means, or instructions for receiving, via radio resource control (RRC) signaling, an indication of the priority groups.

In some examples of the method, apparatuses, and non-transitory computer-readable medium described herein, the first synchronization source may include a first UE, and the second synchronization source may include a second UE.

In some examples of the method, apparatuses, and non-transitory computer-readable medium described herein, the communications with the one or more devices may include sidelink communications, and the first configuration may be received over a sidelink with the first synchronization source and the second configuration may be received over a sidelink with the second synchronization source.

DETAILED DESCRIPTION

Figure 1:
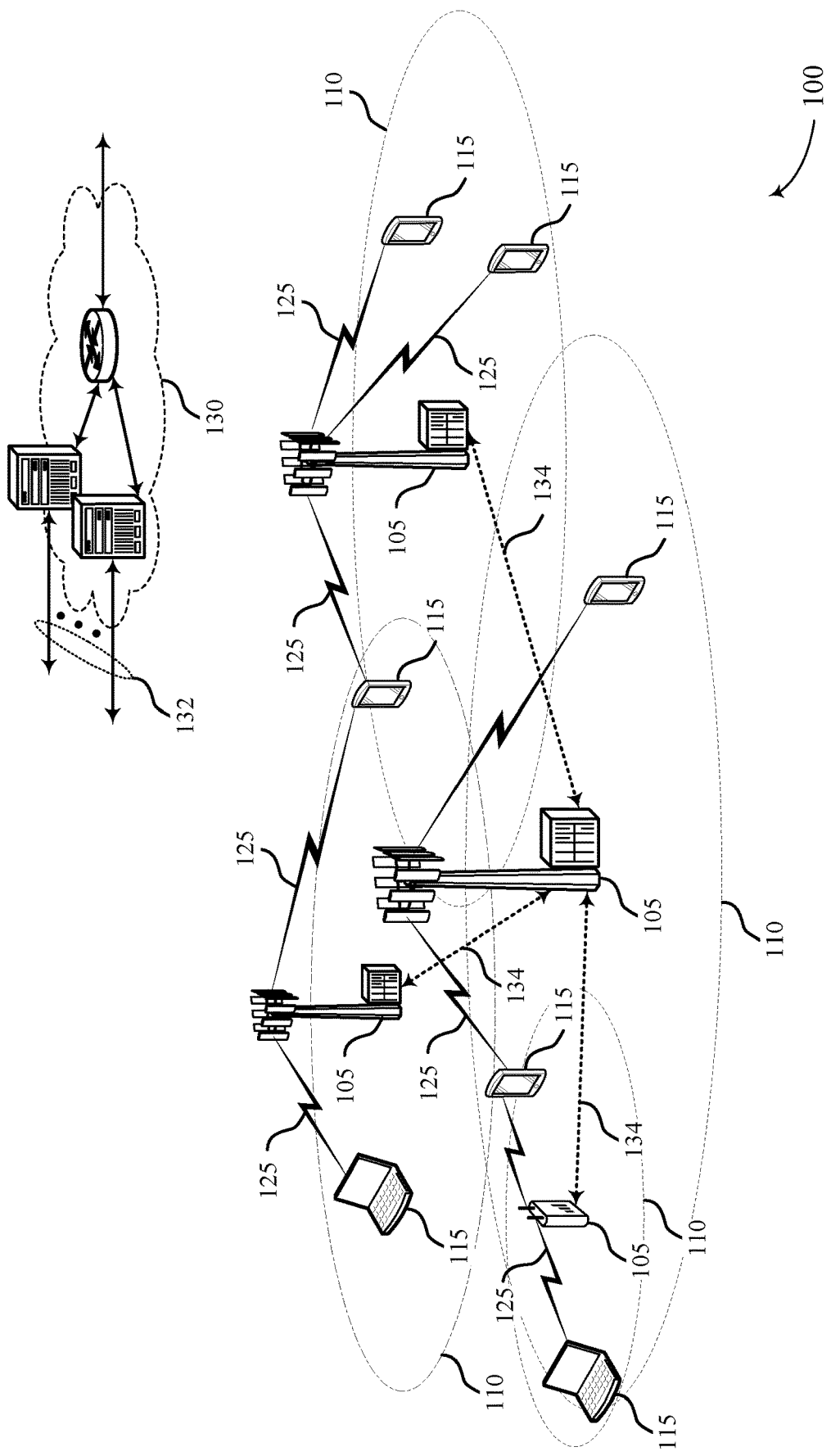
FIG. 1 illustrates an example of a system for wireless communications that supports techniques for synchronizing based on sidelink synchronization signal prioritization in accordance with aspects of the present disclosure.

In some wireless communications systems, a user equipment (UE) may receive synchronization signals from a synchronous source (e.g., a synchronization source) to enable the UE to synchronize with the synchronous source prior to establishing a connection and communicate with the synchronous source. For example, the synchronization signals may allow the UE to transmit and receive messages with the synchronous source according to timings as indicated by the synchronization signals (e.g., the UE adjusts timings to align with timings of the synchronous source). In some cases, the synchronous source may be a base station, a synchronization reference UE, or a similar wireless device that is connected to a global navigation satellite system (GNSS), where the timings associated with the synchronization signals are determined from the GNSS. Alternatively, the synchronous source may be outside of a coverage area for the GNSS and may determine timings to indicate with the synchronization signals without the aid of the GNSS. Accordingly, the UE attempting to establish the connection with the synchronous source, where the synchronous source is outside the GNSS coverage, may receive sidelink synchronization signals from the synchronous source for the synchronization. In some cases, the UE may receive multiple sidelink synchronization signals from respective multiple synchronous sources but may not know which synchronous source to select.

As described herein, the UE may identify synchronous or synchronization source identifications (IDs) corresponding to synchronization signals (e.g., configurations) received from different synchronous sources (e.g., synchronization sources) and determine which synchronous source to use for synchronization based on the synchronous or synchronization source IDs. For example, the UE may receive a first set of synchronization signals (e.g., a first configuration) from a first synchronous source (e.g., a first sidelink UE, a first synchronization source, etc.) and may receive a second set synchronization signals (e.g., a second configuration) from a second synchronous source (e.g., a second sidelink UE, a second synchronization source, etc.), where the UE determines a first priority for the first synchronous source based on a first ID associated with the first set of synchronization signals and a second priority for the second synchronous source based on a second ID associated with the second set of synchronization signals (e.g., lower IDs correspond to a higher priority). Accordingly, the UE may then select the first synchronous source or the second synchronous source based on which synchronous source has a higher priority and communicate with the selected synchronous source (e.g., via sidelink communications). Additionally, the UE may determine a first power measurement (e.g., reference signal received power (RSRP) measurement) for the first set of synchronization signals and a second power measurement for the second set of synchronization signals, where selecting the first synchronous source or the second synchronous source is based on the first power measurement and the second power measurement. In some examples, the UE may communicate with one or more device using synchronization information associated with the selected synchronous source, where the one or more device may include the first synchronous source, the second synchronous source, both the first synchronous source and the second synchronous source, or neither the first synchronous source nor the second synchronous source (e.g., an additional wireless device).

Aspects of the disclosure are initially described in the context of a wireless communications system. Additionally, aspects of the disclosure are illustrated through an additional wireless communications system, synchronization signal coverages, a synchronization signal block, and a process flow. Aspects of the disclosure are further illustrated by and described with reference to apparatus diagrams, system diagrams, and flowcharts that relate to techniques for synchronizing based on sidelink synchronization signal prioritization.

FIG. 1 illustrates an example of a wireless communications system 100 that supports techniques for synchronizing based on sidelink synchronization signal prioritization in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying an amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of an mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in a physical broadcast channel (PBCH). In some cases, the PSS, SSS, and PBCH may be received in a synchronization signal/PBCH block (SSB). The MIB may contain system bandwidth information, an SFN, and a physical channel HARQ indicator channel (PHICH) configuration. After decoding the MIB, the UE 115 may receive one or more system information blocks (SIBs). For example, a first SIB (SIB1) may contain cell access parameters and scheduling information for other SIBs. Decoding SIB1 may enable the UE 115 to receive a second SIB (SIB2). SIB2 may contain RRC configuration information related to random access channel (RACH) procedures, paging, physical uplink control channel (PUCCH), physical uplink shared channel (PUSCH), power control, sounding reference signal (SRS), and cell barring.

In some cases, wireless communication system 100 may include or support networks used for vehicle-based communications, also referred to as vehicle-to-everything (V2X), enhanced V2X (eV2X), vehicle-to-vehicle (V2V) networks, cellular V2X (C-V2X) networks, or other similar networks. Vehicle based communication networks may provide always-on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged.

Some wireless communications systems (e.g., including V2X communications) may include D2D communications. For example, a first UE 115 may communicate with an additional UE 115 over sidelink channels. In the sidelink communications, the first UE 115 may synchronize with a synchronous source (e.g., the additional UE 115) prior to establishing a connection and communicating with the synchronous source (e.g., similar to the synchronization procedures described herein. Accordingly, for sidelink synchronization, the first UE 115 may receive sidelink PSSs (S-PSSs), sidelink SSSs (S-SSSs), a physical sidelink broadcast channel (PSBCH), etc., where the S-PSS, S-SSS, and PSBCH are received in a sidelink SSB (S-SSB).

Additionally, the first UE 115 may use reduced complexity synchronization procedures (e.g., data-aided, synchronous S-SSB, etc.) when synchronizing with the synchronous source. In some cases, the synchronization sources may include a GNSS, a base station 105 (e.g., eNB, gNB, etc.), a synchronization reference UE (e.g., SynchRef UE), etc. A baseline synchronous source may include GNSS and base station-based synchronization. In some cases, the first UE 115 may include a UE capability that includes support of an S-SSB based synchronization (e.g., with a SyncRef UE as source). Additionally, the first UE 115 may also include a UE capability that includes support of the reduced complexity synchronization procedures. Accordingly, the first UE 115 may use a data-aided/non-SSB based synchronization mechanism, a synchronous-SSB based synchronization mechanism (e.g., perform S-SSB search within a time window), or a combination thereof. In some cases, GNSS based synchronization alone may not be sufficient or robust for different use cases (e.g., V2X communications).

Figure 2:
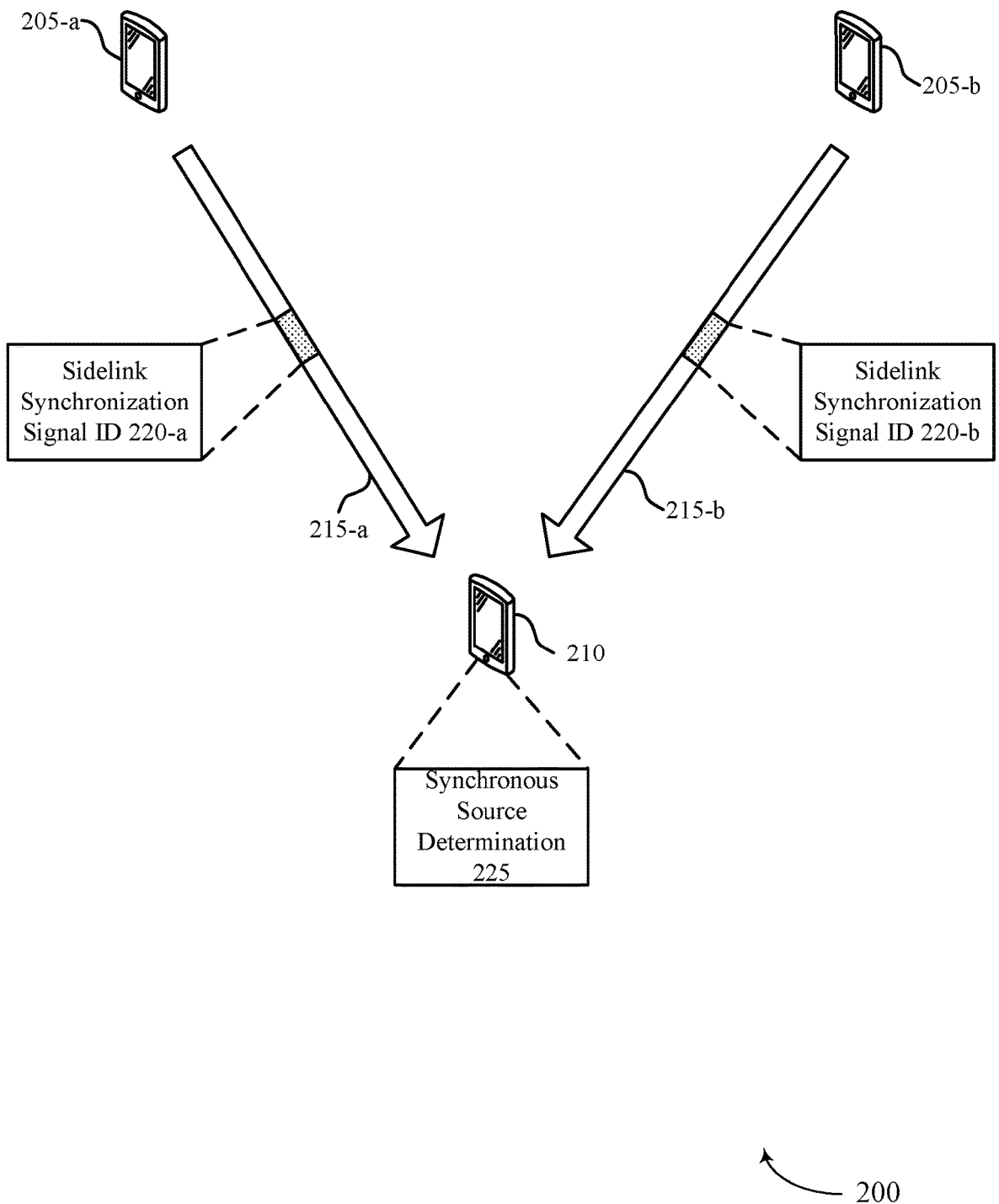
FIG. 2 illustrates an example of a wireless communications system that supports techniques for synchronizing based on sidelink synchronization signal prioritization in accordance with aspects of the present disclosure.

FIG. 2 illustrates an example of a wireless communications system 200 that supports techniques for synchronizing based on sidelink synchronization signal prioritization in accordance with aspects of the present disclosure. In some examples, wireless communications system 200 may implement aspects of wireless communications system 100. Wireless communications system 200 may include one or more synchronous source UEs 205 (e.g., synchronization source UEs, synchronization reference UEs, SynchRef UEs, etc.) that provide synchronization information (e.g., S-PSS, S-SSS, PSBCH, S-SSB, etc.) to a UE 210, where the synchronous source UEs 205 and UE 210 may represent examples of UEs 115 as described herein with reference to FIG. 1. For example, a first synchronous source UE 205-a and a second synchronous source UE 205-b may transmit respective synchronization signals to UE 210 on a first sidelink 215-a and a second sidelink 215-b (e.g., first synchronous source UE 205-a uses first sidelink 215-a and second synchronous source UE 205-b uses second sidelink 215-b). Accordingly, UE 210 may attempt to establish sidelink communications with one or both synchronous source UEs 205.

In some cases, the synchronous source UEs 205 may be out of coverage of a GNSS. As such, each synchronous source UE 205 may select a sidelink synchronization signal (SLSS) ID 220 randomly from a first set of IDs, where the first set of IDs are used for synchronous sources out of coverage of the GNSS. For example, the first set of IDs may include 170 to 355, where 0 to 169 may represent reserved IDs for synchronous sources in coverage of the GNSS. By randomly selecting sidelink synchronization signal IDs 220 from the first set of IDs, clusters may form for each synchronous source based on different UEs connecting to a same synchronous source via the sidelink synchronization signal IDs 220. Over time, nearby clusters may merge and form bigger cluster so that UEs in a same vicinity are following a same synchronization source (e.g., a synchronous source UE 205).

However, in some cases, clusters may not merge based on a UE 115 using power measurements for selecting a synchronous source. For example, the power measurements may include an RSRP measurement, a reference signal received quality (RSRQ) measurement, a signal-to-noise ratio (SNR), a signal-to-interference-plus-noise ratio (SINR), etc. In some cases, UE 210 may receive synchronization signals from both the first synchronous source UE 205-a and from the second synchronous source UE 205-b and may use the power measurements to determine which synchronous source UE 205 for subsequent synchronization and communications. By using the power measurements, UE 210 may not select a same synchronous source UE 205 as nearby additional UEs, which may lead to a higher number of small clusters, rather than fewer but larger clusters. As such, the higher amount of smaller clusters may impact the chances of UEs in close proximity to each other to have similar synchronization timings.

As described herein, synchronous source UEs 205 may still select a sidelink synchronization signal ID 220 randomly from 170 to 355 (e.g., the first set of IDs) when the synchronous source UEs 205 are out of coverage of the GNSS (e.g., and no other synchronous references are detected). The sidelink synchronization signal IDs 220 may be treated from higher priority to lower priority in ascending order (e.g., ID 170 is higher compared to 171, etc.). For example, first synchronous source UE 205-a may use a first sidelink synchronization signal ID 220-a, and second synchronous source UE 205-b may use a second sidelink synchronization signal ID 220-b.

Each synchronous source UE 205 may transmit an indication of the randomly selected sidelink synchronization signal ID 220 with the synchronization signals (e.g., or with a synchronization configuration indication, via RRC signaling, etc.), and UE 210 may determine which synchronous source UE 205 has a higher priority based on the indication sidelink synchronization signal IDs 220 in a synchronous source determination 225. In some cases, UE 210 (e.g., and any additional nearby UEs, UEs in neighboring clusters, etc.) may determine power measurements of synchronization signals from the synchronous source UEs 205 and perform synchronous source determination 225 to select a synchronous source UE 205 based on the power measurements as well as the priorities of the sidelink synchronization signal IDs 220. For example, UE 210 may select a higher priority synchronous source UE 205 (e.g., as determined based on having a lower sidelink synchronization signal ID 220) as long as the higher priority synchronous source UE 205 has a sufficient power measurement (e.g., exceeds a threshold value). Accordingly, if UEs in neighboring clusters detect another sidelink synchronization signal IDs 220 with a higher priority than a current sidelink synchronization signal IDs 220, then the UEs in the neighboring clusters may select to use the synchronous source UE 205 with the sidelink synchronization signal ID 220 with a higher priority (e.g., provided the selected synchronous source UE 205 has a sufficient power measurement).

Additionally or alternatively, the first set of IDs associated with synchronous sources outside of coverage of the GNSS may be divided in priority groups. For example, the grouping may include 170 to 180 for a first priority (e.g., priority 1 (P1)), 181-190 for a second (e.g., lower) priority (e.g., priority 2 (P2)), etc. This grouping may be fixed or indicated via RRC signaling (e.g., RRC configured). UE 210 may then perform synchronous source determination 225 to determine which synchronous source UE 205 has a higher priority based on a priority group that the sidelink synchronization signal IDs 220 belong. Based on using synchronous source determination 225 to select a synchronous source UE 205 based on the sidelink synchronization signal IDs 220 (e.g., and power measurements), UEs may merge clusters faster and larger clusters may form for UEs in a vicinity.

Figure 3A:
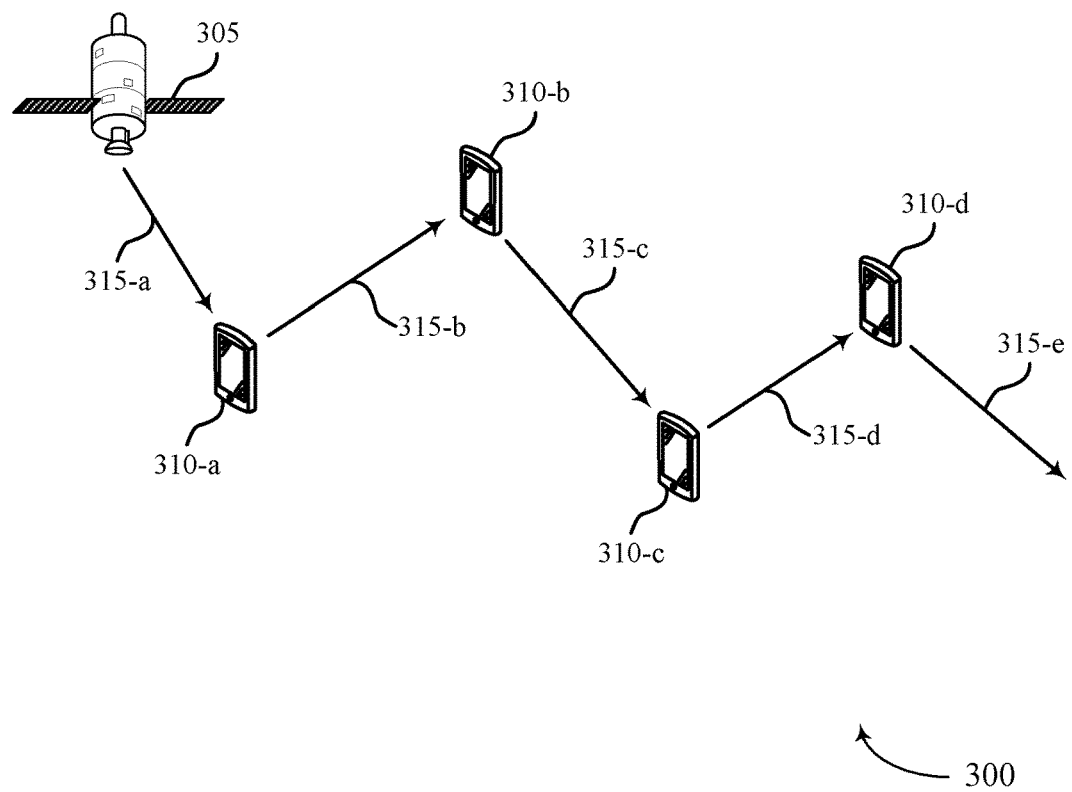
FIGS. 3A and 3B illustrate examples of synchronization signal coverages that supports techniques for synchronizing based on sidelink synchronization signal prioritization in accordance with aspects of the present disclosure.
Figure 3B:
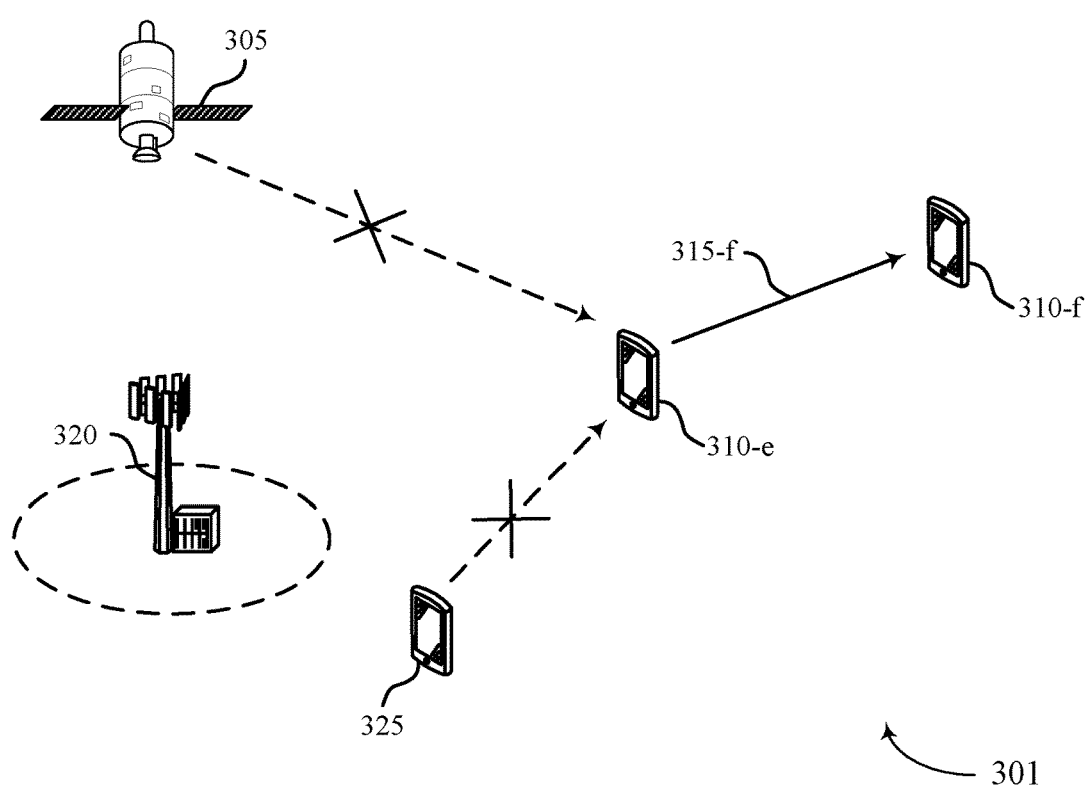

FIGS. 3A and 3B illustrate examples of synchronization signal coverages 300 and 301 that support techniques for synchronizing based on sidelink synchronization signal prioritization in accordance with aspects of the present disclosure. In some examples, synchronization signal coverages 300 and 301 may implement aspects of wireless communications system 100 and wireless communications system 200. Additionally, synchronization signal coverage 300 may illustrate an example of an in-GNSS coverage, and synchronization signal coverage 301 may illustrate an example of out-of-GNSS coverage. For example, the GNSS coverage may include a UE 310 being in direct or indirect contact with a satellite 305. In some cases, synchronization signal coverages 300 and 301 may be used as distributed synchronization procedures for one or more UEs 310, which may be examples of corresponding UEs as described herein with reference to FIGS. 1-2.

As shown in synchronization signal coverage 300, a first UE 310-a may have a connection 315-a that is direct to the satellite 305 (e.g., in-GNSS coverage). Accordingly, connection 315-a may indicate that the type of synchronization includes a GNSS based synchronization (e.g., typeSync=GNSS). First UE 310-a may then become a synchronization reference (e.g., SynchRef, synchronization source, etc.) for additional UEs 310. For example, a second UE 310-b may use a connection 315-b to synchronize and communicate with first UE 310-a, where connection 315-b includes a sidelink synchronization signal ID of 0 (e.g., indicating the synchronization signals are synchronized to the GNSS), a subframe resource to transmit/receive the synchronization signals (e.g., either a first or second resource in the subframe, such as a resource-1 or a resource-2), and an indication of whether first UE 310-a is in-coverage of the satellite 305 (e.g., in-coverage (INC)=TRUE).

Subsequently, in some cases, second UE 310-b may then transmit synchronization signals to a third UE 310-c on a connection 315-c based on the GNSS timings from first UE 310-a. For example, connection 315-c may include a sidelink synchronization signal ID of the source UE (e.g., first UE 310-a, where the sidelink synchronization signal ID is 0), a different subframe resource for transmitting/receiving the synchronization signals (e.g., subframe=resource-2), and an indication whether second UE 310-b is in-coverage of the satellite 305 (e.g., INC=FALSE). Additionally, third UE 310-c may then transmit synchronization signals to a fourth UE 310-d on a connection 315-d based on GNSS timings from first UE 310-a and relayed through second UE 310-b. For example, connection 315-d may include a sidelink synchronization signal ID of a source UE (e.g., second UE 310-b) plus 168 (e.g., 0 for second UE 310-b+168=168), a different subframe resource for transmitting/receiving the synchronization signals than second UE 310-b (e.g., source UE, whose subframe=resource-2, so subframe=resource-1 for third UE 310-c), and an indication whether third UE 310-c is in-coverage of the satellite 305 (e.g., INC=FALSE). Third UE 310-c may add 168 to the sidelink synchronization signal ID of the source UE to differentiate synchronization signals transmitted by each UE 310, since a same subframe resource is used.

Additionally, fourth UE 310-d may then provide synchronization information (e.g., the synchronization signals) to one or more UEs down a chain of UEs 310 over a connection 315-e. For example, connection 315-e may include a sidelink synchronization signal ID of a source UE (e.g., third UE 310-c, where the sidelink synchronization signal ID is 168), a different subframe resource for transmitting/receiving the synchronization signals than third UE 310-c (e.g., source UE, whose subframe=resource-a, so subframe=resource-2 for fourth UE 310-d), and an indication whether fourth UE 310-d is in-coverage of the satellite 305 (e.g., INC=FALSE). UEs 310 may continue to transmit synchronization signals down the chain of UEs 310, where each subsequent UE 310 may use a same sidelink synchronization ID and an inverse resource as a previous UE 310 in the chain of UEs 310. Each connection 315 may include a resource selection, an S-SSB ID determination (e.g., sidelink synchronization signal ID), an indication of a synchronization reference selection/reselection, etc. In some cases, a synchronization reference UE (e.g., a UE 310 that transmits synchronization signals with timings from the GNSS) may be connected directly to a base station or the GNSS (e.g., satellite 305), may be connected indirectly (e.g., greater than one hop from the base station or the GNSS), or may be an independent synchronization source.

Additionally or alternatively, as shown in synchronization signal coverage 301, a UE 310 may be in an out-of-GNSS coverage scenario. For example, a fifth UE 310-e may not be connected to a satellite 305 (e.g., GNSS coverage), outside of a geographic coverage area of a base station 320, not connected to a synchronization reference UE 325, etc. Accordingly, fifth UE 310-e may randomly select a sidelink synchronization signal ID from a first set of IDs reserved for synchronous source UEs out-of-GNSS coverage (e.g., 170 to 355). Additionally, fifth UE 310-e may also select a subframe resource to use for transmitting synchronization signals to additional UEs 310 nearby (e.g., subframe=resource-1 or resource-2) and an indication whether fifth UE 310-*e* is in-coverage of the GNSS (e.g., INC=FALSE). Fifth UE 310-*e* may then indicate the randomly selected sidelink synchronization signal ID, the selected subframe resource, and the GNSS coverage indication for a connection 315-*f*. For example, a sixth UE 310-*f* may receive synchronization signals via connection 315-*f* from fifth UE 310-*e* according to the different parameters indicated above. In some cases, sixth UE 310-*f* may then transmit synchronization signals to nearby UEs 310 using a sidelink synchronization signal ID same as a source UE for sixth UE 310-*f* (e.g., sidelink synchronization signal ID for fifth UE 310-*e*), an opposite subframe resource used by the source UE (e.g., fifth UE 310-*e*), and an indication of whether sixth UE 310-*f* is in-coverage of the GNSS (e.g., INC=FALSE). As described herein, a UE 310 may determine a priority level for a source UE that transmits synchronization signals based on a sidelink synchronization signal ID for the source UE.

Figure 4:
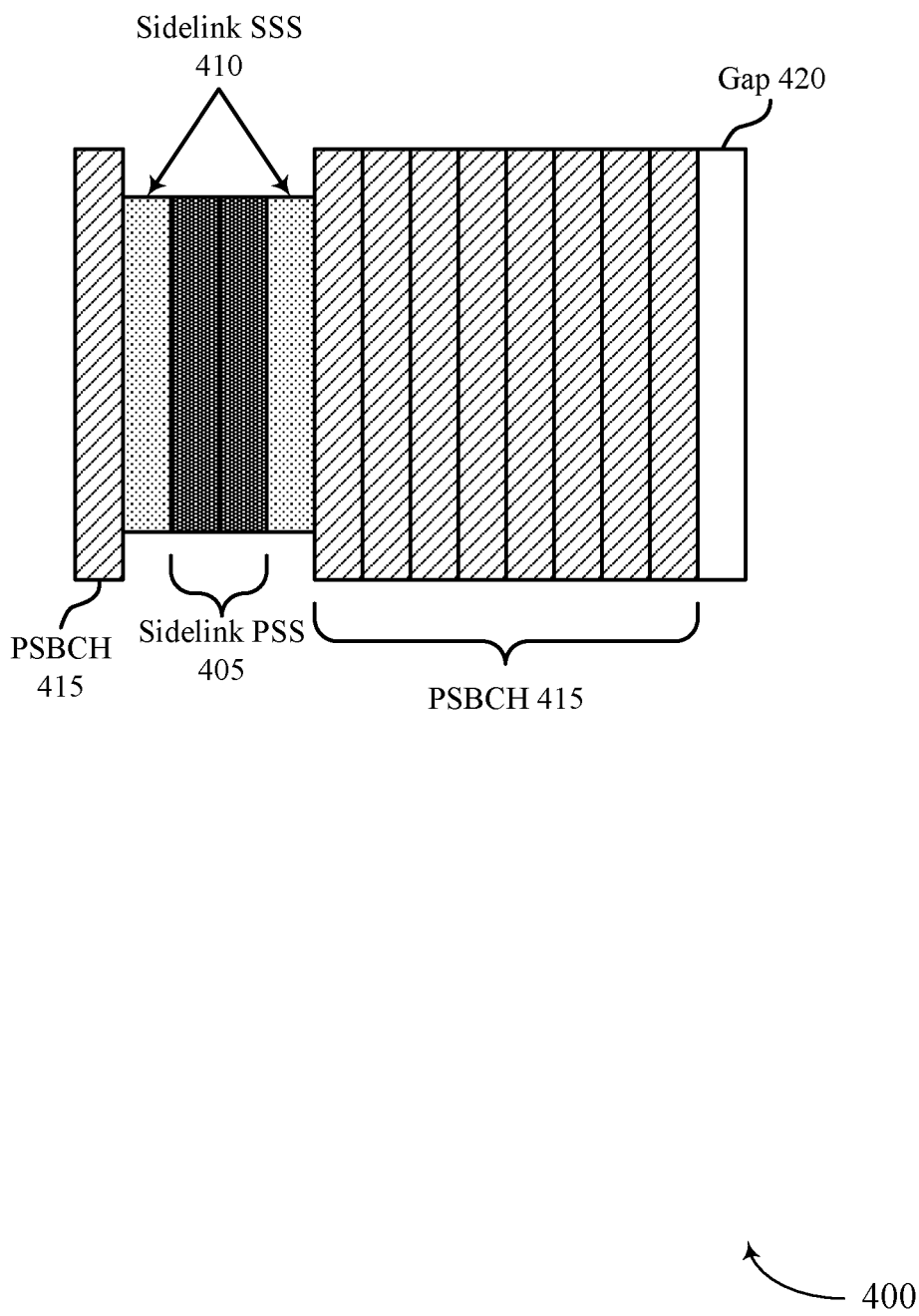
FIG. 4 illustrates an example of a synchronization signal block that supports techniques for synchronizing based on sidelink synchronization signal prioritization in accordance with aspects of the present disclosure.

FIG. 4 illustrates an example of a synchronization signal block 400 that supports techniques for synchronizing based on sidelink synchronization signal prioritization in accordance with aspects of the present disclosure. In some examples, synchronization signal block 400 may implement aspects of wireless communications system 100 and wireless communications system 200. One or more UEs may use synchronization signal block 400 to transmit and receive synchronization signals with other UEs. For example, synchronization signal block 400 may represent an S-SSB (e.g., which may be used for V2X communications).

As shown, synchronization signal block 400 may span 14 symbols (e.g., a slot) in the time-domain and 11 resource blocks (RBs) in the frequency-domain. Additionally, synchronization signal block 400 may include two S-PSSs 405 in two symbols and two S-SSSs 410 in two symbols. The S-PSSs 405 and the S-SSSs 410 may include a set amount of subcarriers (e.g., 127 subcarriers) that is less than the 11 RBs allocated for synchronization signal block 400. In some cases, a UE may use a first sequence (e.g., an M-sequence) for the S-PSSs 405 and a second sequence (e.g., a Gold-sequence) for the S-SSSs 410. Synchronization signal block 400 may also include a PSBCH 415 for the rest of the symbols in the slot, except for the last symbol of the slot, which may be used as a gap 420 before a subsequent slot begins. In some cases, synchronization signal block 400 (e.g., an S-SSB) may include a set periodicity (e.g., 160 ms). Additionally or alternatively, the periodicity may be configurable. While the S-PSSs 405 and the S-SSSs 410 are shown to occupy the second through fifth symbols of the slot, the location of the S-PSSs 405 and the S-SSSs 410 may vary and be configured via higher layer signaling (e.g., RRC signaling) or may be predefined.

Figure 5:
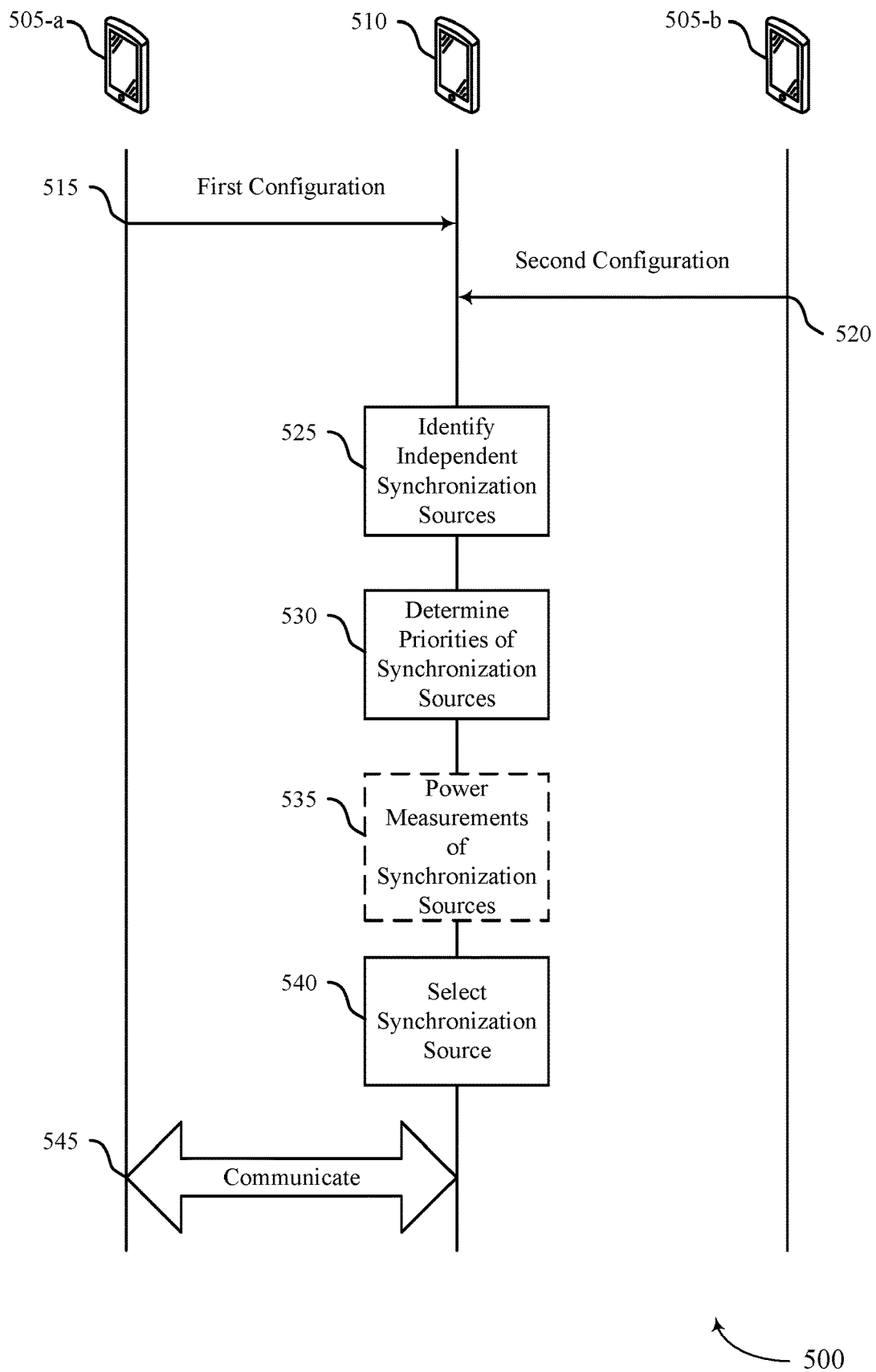
FIG. 5 illustrates an example of a process flow that supports techniques for synchronizing based on sidelink synchronization signal prioritization in accordance with aspects of the present disclosure.

FIG. 5 illustrates an example of a process flow 500 that supports techniques for synchronizing based on sidelink synchronization signal prioritization in accordance with aspects of the present disclosure. In some examples, process flow 500 may implement aspects of wireless communications system 100 and wireless communications system 200. Process flow 500 may include a UE 505-*a*, a UE 505-*b*, and a UE 510, which may be examples of UEs as described herein with reference to FIGS. 1-4. As described herein, UE 510 may be attempting to synchronize and communicate in a wireless communications system but may be outside of a GNSS coverage area. Accordingly, UE 510 may attempt to synchronize with UE 505-*a* and/or UE 505-*b*, which may be independent synchronous sources also out of GNSS coverage areas (e.g., and/or out of a coverage area of a base station 105).

In the following description of the process flow 500, the operations between UE 505-*a*, UE 505-*b*, and UE 510 may be transmitted in a different order than the order shown, or the operations performed by UE 505-*a*, UE 505-*b*, and UE 510 may be performed in different orders or at different times. Some operations may also be left out of the process flow 500, or other operations may be added to the process flow 500. It is to be understood that while UE 505-*a*, UE 505-*b*, and UE 510 are shown performing a number of the operations of process flow 500, any wireless device may perform the operations shown.

At 515, UE 510 may receive a first configuration from a first synchronization source (e.g., UE 505-*a*), the first configuration including a first synchronization source ID associated with the first synchronization source. At 520, UE 510 may receive a second configuration from a second synchronization source (e.g., UE 505-*b*), the second configuration including a second synchronization source ID associated with the second synchronization source. In some cases, the first synchronization source may be a first UE (e.g., UE 505-*a*) and the second synchronization source may be a second UE (e.g., UE 505-*b*). Additionally, the first configuration may be received over a sidelink with the first synchronization source, and the second configuration may be received over a sidelink with the second synchronization source.

At 525, UE 510 may identify the first synchronization source ID and the second synchronization source ID are from a first set of synchronization source IDs associated with independent synchronization sources. In some cases, the independent synchronization sources associated with the first set of synchronization source IDs may include synchronization sources out of a GNSS coverage, not connected to a base station, independent of a reference, or a combination thereof.

At 530, UE 510 may determine a first priority for the first synchronization source based on the first synchronization source ID and a second priority for the second synchronization source based on the second synchronization source ID. In some cases, the first priority may be higher than the second priority based on the first synchronization source ID being lower than the second synchronization source ID. Additionally or alternatively, the first priority and the second priority may be determined based on priority groups within the first set of synchronization source IDs associated with the independent synchronization sources. In some cases, UE 510 may receive, via RRC signaling, an indication of the priority groups.

At 535, UE 510 may determine an RSRP measurement (e.g., or similar power measurement) for the first synchronization source and an RSRP measurement (e.g., or similar power measurement) for the second synchronization source, where the first synchronization source may be selected based on the RSRP measurement for the first synchronization source. In some cases, when the first synchronization source ID has a same value as the second synchronization source ID, UE 510 may determine the RSRP measurement for the first synchronization source and the RSRP measurement for the second synchronization source, where the first synchronization source may then be selected based on the RSRP measurement for the first synchronization source.

At 540, UE 510 may select the first synchronization source (e.g., UE 505-*a*) based on the first priority being higher than the second priority.

At 545, UE 510 may communicate with one or more devices using synchronization information associated with the selected first synchronization source (e.g., UE 505-*a*) as a synchronization reference. For example, the communications with the one or more devices may include sidelink communications. In some cases, UE 510 may receive the second configuration from the second synchronization source, identify the second synchronization source ID has a higher priority than the first synchronization source ID, and transition communications with the one or more devices from using synchronization information associated with the selected first synchronization source to using synchronization information associated with the second synchronization source based on the higher priority of the second synchronization source ID. Additionally or alternatively, UE 510 may identify a third synchronization source including a third synchronization source ID, the third synchronization source ID being from a second set of synchronization source IDs associated with a higher priority than the first set of synchronization source IDs and communicate with the one or more devices using synchronization information associated with the third synchronization source based on the second set of synchronization source IDs having the higher priority than the first set of synchronization source IDs. For example, the second set of synchronization source IDs may be associated with a GNSS coverage.

Figure 6:
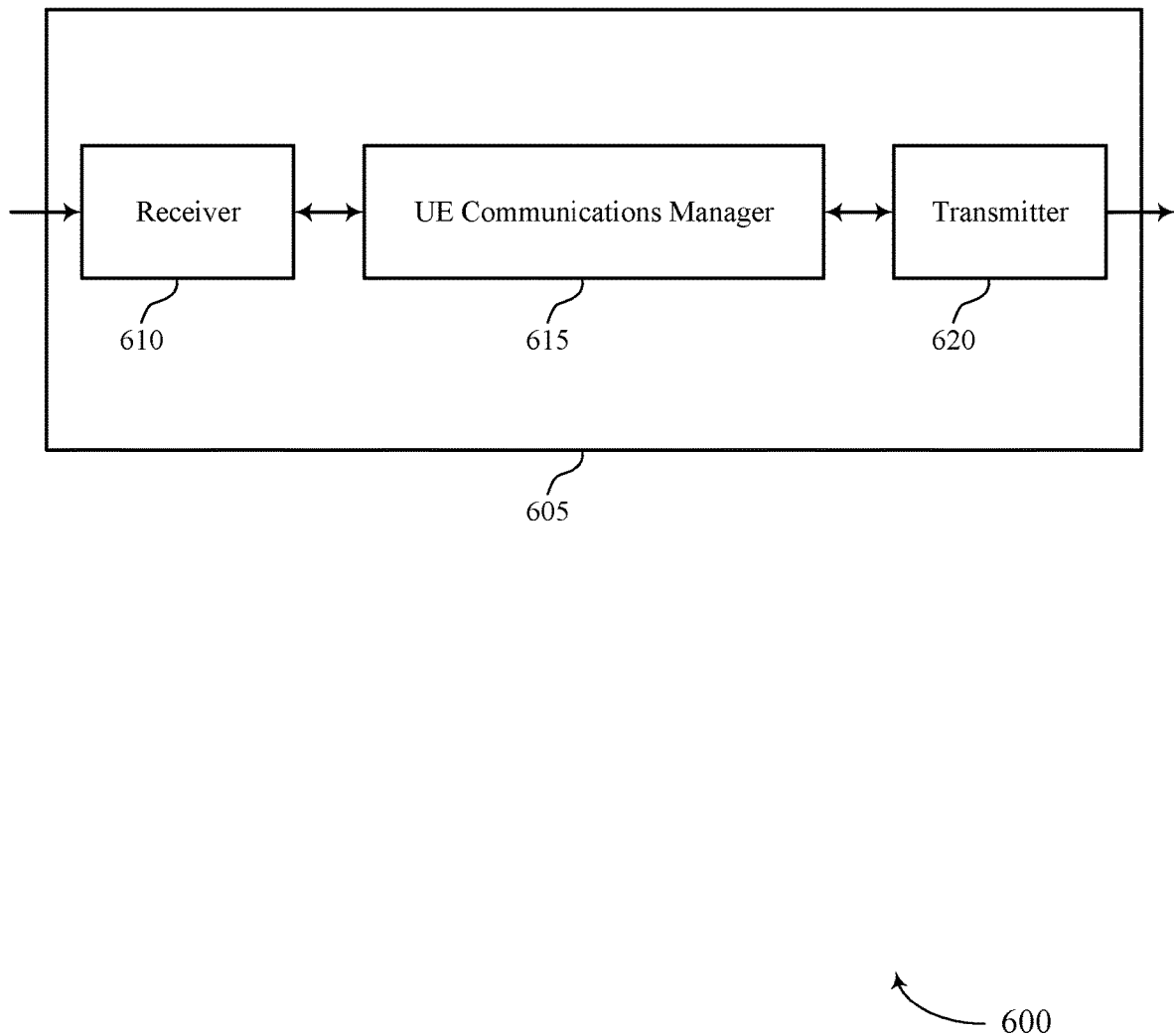
FIGS. 6 and 7 show block diagrams of devices that support techniques for synchronizing based on sidelink synchronization signal prioritization in accordance with aspects of the present disclosure.

FIG. 6 shows a block diagram 600 of a device 605 that supports techniques for synchronizing based on sidelink synchronization signal prioritization in accordance with aspects of the present disclosure. The device 605 may be an example of aspects of a UE as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for synchronizing based on sidelink synchronization signal prioritization, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a first configuration from a first synchronization source, the first configuration including a first synchronization source ID associated with the first synchronization source. Additionally, the UE communications manager 615 may receive a second configuration from a second synchronization source, the second configuration including a second synchronization source ID associated with the second synchronization source. In some cases, the UE communications manager 615 may identify the first synchronization source ID and the second synchronization source ID are from a first set of synchronization source IDs associated with independent synchronization sources. Accordingly, the UE communications manager 615 may determine a first priority for the first synchronization source based on the first synchronization source ID and a second priority for the second synchronization source based on the second synchronization source ID. Subsequently, the UE communications manager 615 may select the first synchronization source based on the first priority being higher than the second priority and communicate with one or more devices using synchronization information associated with the selected first synchronization source as a synchronization reference. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to select a synchronization source from a set of synchronization sources based on which synchronization source has a higher priority. Based on the techniques for selecting a synchronization source, the device 605 may more accurate synchronization for communication with the selected synchronization source.

As such, the device 605 may increase the likelihood of accurately selecting a synchronization source and, accordingly, may communicate over the channel with a greater likelihood of successful communications. In some examples, based on a greater likelihood of successful communications, the device 605 may more efficiently power a processor or one or more processing units associated transmitting and receiving communications, which may enable the device to save power and increase batter life.

Figure 7:
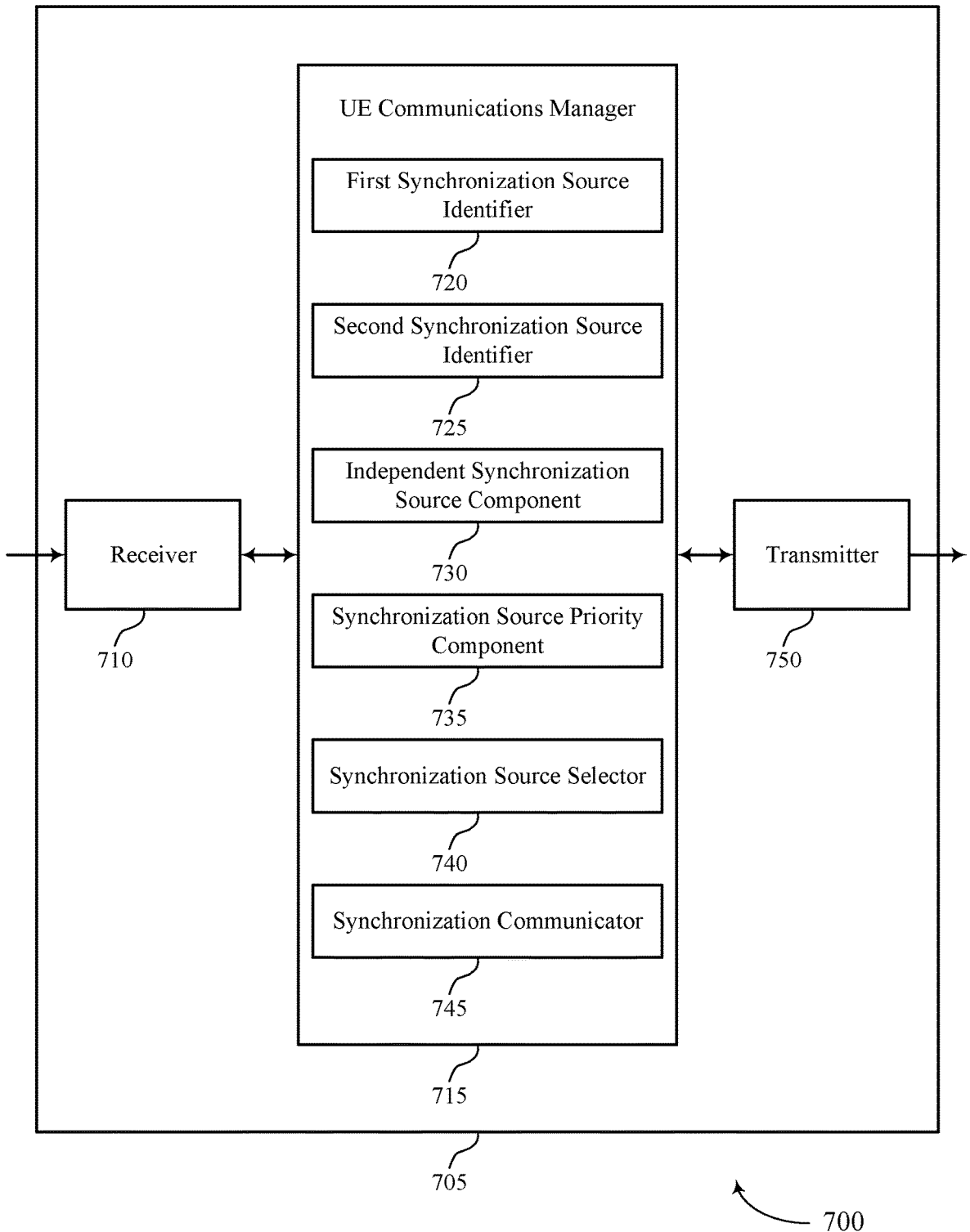

FIG. 7 shows a block diagram 700 of a device 705 that supports techniques for synchronizing based on sidelink synchronization signal prioritization in accordance with aspects of the present disclosure. The device 705 may be an example of aspects of a device 605, or a UE as described herein. The device 705 may include a receiver 710, a UE communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to techniques for synchronizing based on sidelink synchronization signal prioritization, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a first synchronization source identifier 720, a second synchronization source identifier 725, an independent synchronization source component 730, a synchronization source priority component 735, a synchronization source selector 740, and a synchronous communicator 745. The UE communications manager 715 may be an example of aspects of the UE communications manager 910 described herein.

The first synchronization source identifier 720 may receive a first configuration from a first synchronization source, the first configuration including a first synchronization source ID associated with the first synchronization source.

The second synchronization source identifier 725 may receive a second configuration from a second synchronization source, the second configuration including a second synchronization source ID associated with the second synchronization source.

The independent synchronization source component 730 may identify the first synchronization source ID and the second synchronization source ID are from a first set of synchronization source IDs associated with independent synchronization sources.

The synchronization source priority component 735 may determine a first priority for the first synchronization source based on the first synchronization source ID and a second priority for the second synchronization source based on the second synchronization source ID.

The synchronization source selector 740 may select the first synchronization source based on the first priority being higher than the second priority.

The synchronous communicator 745 may communicate with one or more devices using synchronization information associated with the selected first synchronization source as a synchronization reference.

The transmitter 750 may transmit signals generated by other components of the device 705. In some examples, the transmitter 750 may be collocated with a receiver 710 in a transceiver component. For example, the transmitter 750 may be an example of aspects of the transceiver 920 described with reference to FIG. 9. The transmitter 750 may utilize a single antenna or a set of antennas.

Figure 8:
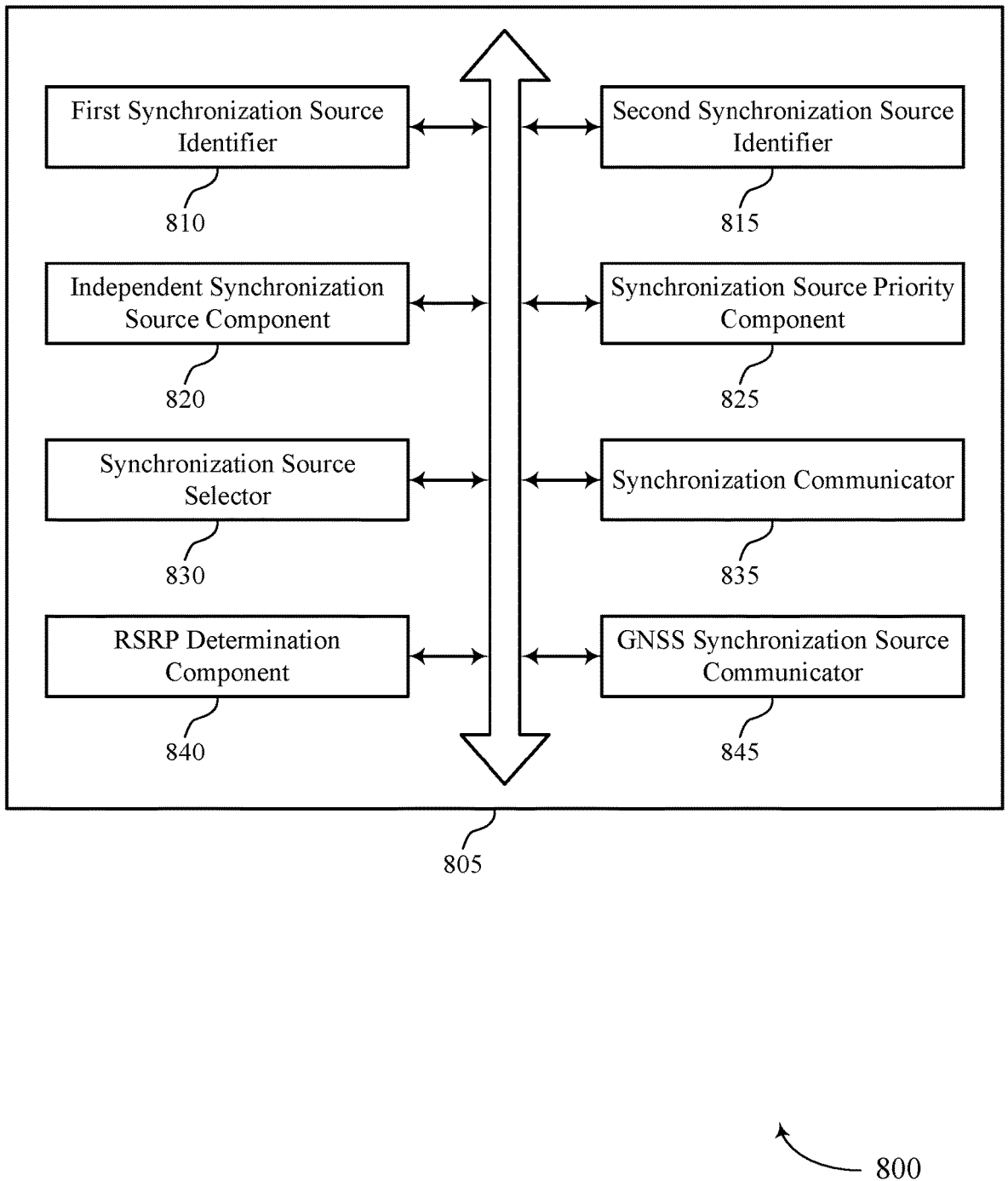
FIG. 8 shows a block diagram of a user equipment (UE) communications manager that supports techniques for synchronizing based on sidelink synchronization signal prioritization in accordance with aspects of the present disclosure.

FIG. 8 shows a block diagram 800 of a UE communications manager 805 that supports techniques for synchronizing based on sidelink synchronization signal prioritization in accordance with aspects of the present disclosure. The UE communications manager 805 may be an example of aspects of a UE communications manager 615, a UE communications manager 715, or a UE communications manager 910 described herein. The UE communications manager 805 may include a first synchronization source identifier 810, a second synchronization source identifier 815, an independent synchronization source component 820, a synchronization source priority component 825, a synchronization source selector 830, a synchronous communicator 835, an RSRP determination component 840, and a GNSS synchronization source communicator 845. Each of these components may communicate, directly or indirectly, with one another (e.g., via one or more buses).

The first synchronization source identifier 810 may receive a first configuration from a first synchronization source, the first configuration including a first synchronization source ID associated with the first synchronization source. The second synchronization source identifier 815 may receive a second configuration from a second synchronization source, the second configuration including a second synchronization source ID associated with the second synchronization source. In some cases, the first synchronization source may include a first UE and the second synchronization source may include a second UE.

The independent synchronization source component 820 may identify the first synchronization source ID and the second synchronization source ID are from a first set of synchronization source IDs associated with independent synchronization sources. In some cases, the independent synchronization sources associated with the first set of synchronization source IDs may include synchronization sources out of a GNSS coverage, not connected to a base station, independent of a synchronization reference, or a combination thereof.

The synchronization source priority component 825 may determine a first priority for the first synchronization source based on the first synchronization source ID and a second priority for the second synchronization source based on the second synchronization source ID. In some cases, the first priority and the second priority may be determined based on priority groups within the first set of synchronization source IDs associated with the independent synchronization sources. Additionally, the synchronization source priority component 825 may receive, via RRC signaling, an indication of the priority groups.

The synchronization source selector 830 may select the first synchronization source based on the first priority being higher than the second priority. In some cases, the first priority may be higher than the second priority based on the first synchronization source ID being lower than the second synchronization source ID.

The synchronous communicator 835 may communicate with an one or more devices using synchronization information associated with the selected first synchronization source as a synchronization reference. In some examples, the synchronous communicator 835 may receive the second configuration from the second synchronization source, identify the second synchronization source ID has a higher priority than the first synchronization source ID, and transition communications with the one or more devices from using the synchronization information associated with the selected first synchronization source to using synchronization information associated with the second synchronization source based on the higher priority of the second synchronization source ID. In some cases, the communications with the one or more devices may include sidelink communications. Additionally, the first configuration may be received over a sidelink with the first synchronization source, and the second configuration may be received over a sidelink with the second synchronization source.

The RSRP determination component 840 may determine a first RSRP measurement (e.g., or similar power measurement) for the first synchronization source and a second RSRP measurement (e.g., or similar power measurement) for the second synchronization source, where the first synchronization source is selected based on the first RSRP measurement for the first synchronization source. In some examples, when the first synchronization source ID has a same value as the second synchronization source ID, the RSRP determination component 840 may also determine the first RSRP measurement for the first synchronization source and the second RSRP measurement for the second synchronization source, where the first synchronization source is then selected based on the first RSRP measurement of the first synchronization source.

The GNSS synchronization source communicator 845 may identify a third synchronization source including a third synchronization source ID, the third synchronization source ID being from a second set of synchronization source IDs associated with a higher priority than the first set of synchronization source IDs. In some examples, the GNSS synchronization source communicator 845 may communicate with the third synchronization source based on the second set of synchronization source IDs having the higher priority than the first set of synchronization source IDs. In some cases, the second set of synchronization source IDs may be associated with a GNSS coverage.

Figure 9:
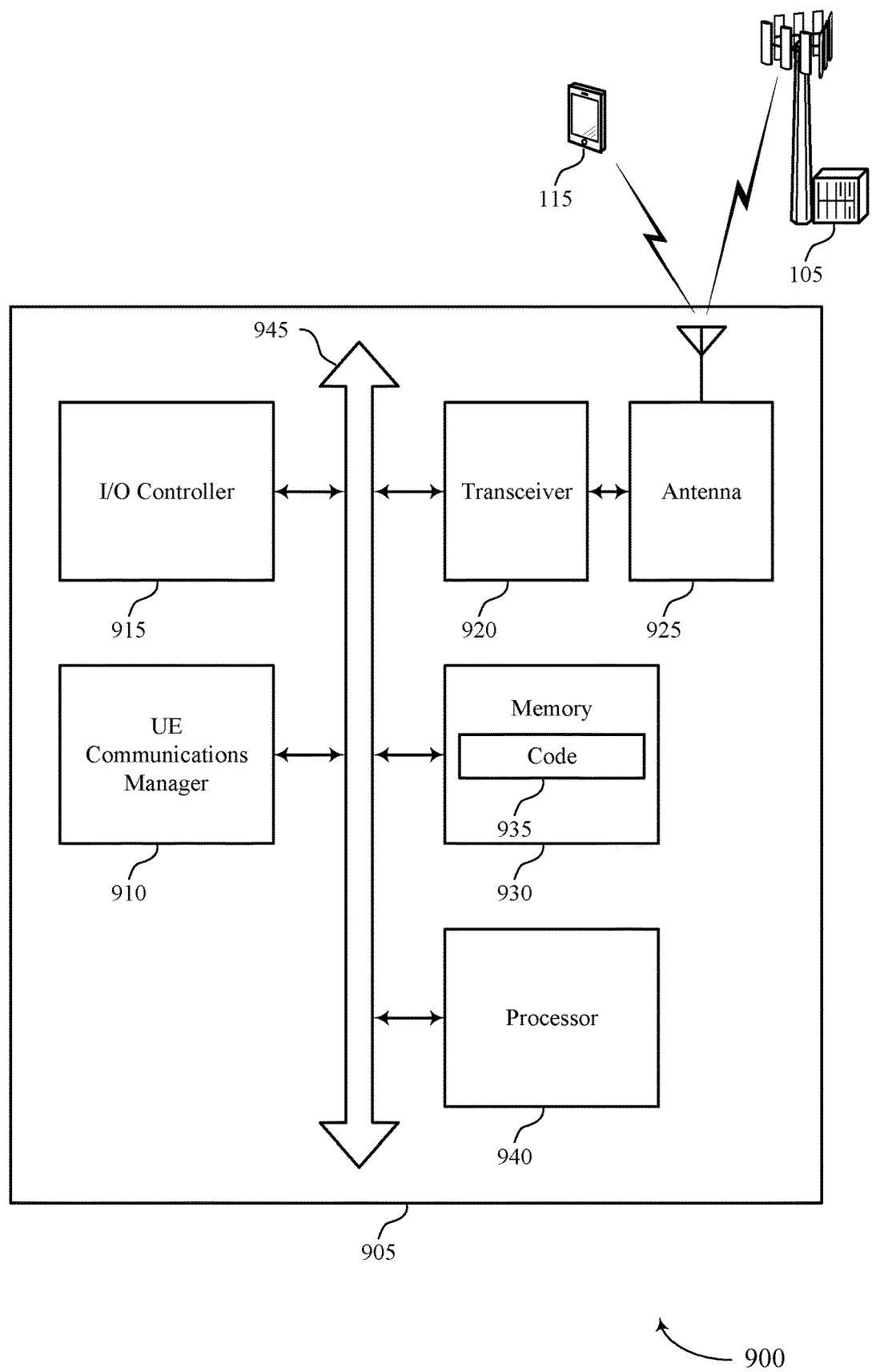
FIG. 9 shows a diagram of a system including a device that supports techniques for synchronizing based on sidelink synchronization signal prioritization in accordance with aspects of the present disclosure.

FIG. 9 shows a diagram of a system 900 including a device 905 that supports techniques for synchronizing based on sidelink synchronization signal prioritization in accordance with aspects of the present disclosure. The device 905 may be an example of or include the components of device 605, device 705, or a UE as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a first configuration from a first synchronization source, the first configuration including a first synchronization source ID associated with the first synchronization source. Additionally, the UE communications manager 910 may receive a second configuration from a second synchronization source, the second configuration including a second synchronization source ID associated with the second synchronization source. In some cases, the UE communications manager 910 may identify the first synchronization source ID and the second synchronization source ID are from a first set of synchronization source IDs associated with independent synchronization sources. Accordingly, the UE communications manager 910 may determine a first priority for the first synchronization source based on the first synchronization source ID and a second priority for the second synchronization source based on the second synchronization source ID. Subsequently, the UE communications manager 910 may select the first synchronization source based on the first priority being higher than the second priority and communicate with one or more devices using synchronization information associated with the selected first synchronization source as a synchronization reference.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for synchronizing based on sidelink synchronization signal prioritization).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
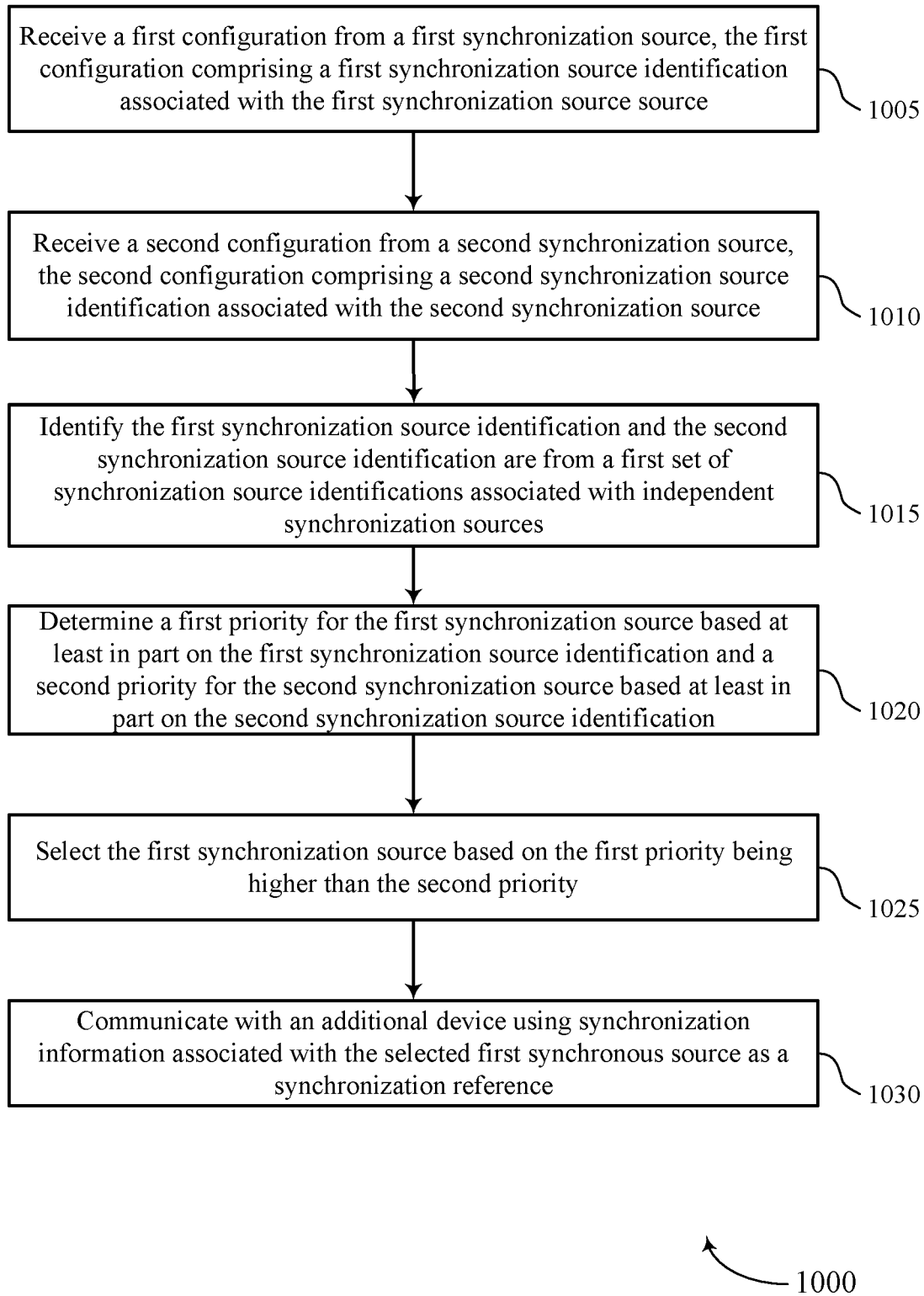
FIGS. 10 through 12 show flowcharts illustrating methods that support techniques for synchronizing based on sidelink synchronization signal prioritization in accordance with aspects of the present disclosure.

FIG. 10 shows a flowchart illustrating a method 1000 that supports techniques for synchronizing based on sidelink synchronization signal prioritization in accordance with aspects of the present disclosure. The operations of method 1000 may be implemented by a UE or its components as described herein. For example, the operations of method 1000 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may receive a first configuration from a first synchronization source, the first configuration including a first synchronization source ID associated with the first synchronization source. The operations of 1005 may be performed according to the methods described herein. In some examples, aspects of the operations of 1005 may be performed by a first synchronization source identifier as described with reference to FIGS. 6 through 9.

At 1010, the UE may receive a second configuration from a second synchronization source, the second configuration including a second synchronization source ID associated with the second synchronization source. The operations of 1010 may be performed according to the methods described herein. In some examples, aspects of the operations of 1010 may be performed by a second synchronization source identifier as described with reference to FIGS. 6 through 9.

At 1015, the UE may identify the first synchronization source ID and the second synchronization source ID are from a first set of synchronization source IDs associated with independent synchronization sources. The operations of 1015 may be performed according to the methods described herein. In some examples, aspects of the operations of 1015 may be performed by an independent synchronization source component as described with reference to FIGS. 6 through 9.

At 1020, the UE may determine a first priority for the first synchronization source based on the first synchronization source ID and a second priority for the second synchronization source based on the second synchronization source ID. The operations of 1020 may be performed according to the methods described herein. In some examples, aspects of the operations of 1020 may be performed by a synchronization source priority component as described with reference to FIGS. 6 through 9.

At 1025, the UE may select the first synchronization source based on the first priority being higher than the second priority. The operations of 1025 may be performed according to the methods described herein. In some examples, aspects of the operations of 1025 may be performed by a synchronization source selector as described with reference to FIGS. 6 through 9.

At 1030, the UE may communicate with one or more devices using synchronization information associated with the selected first synchronization source as a synchronization reference. The operations of 1030 may be performed according to the methods described herein. In some examples, aspects of the operations of 1030 may be performed by a synchronous communicator as described with reference to FIGS. 6 through 9.

Figure 11:
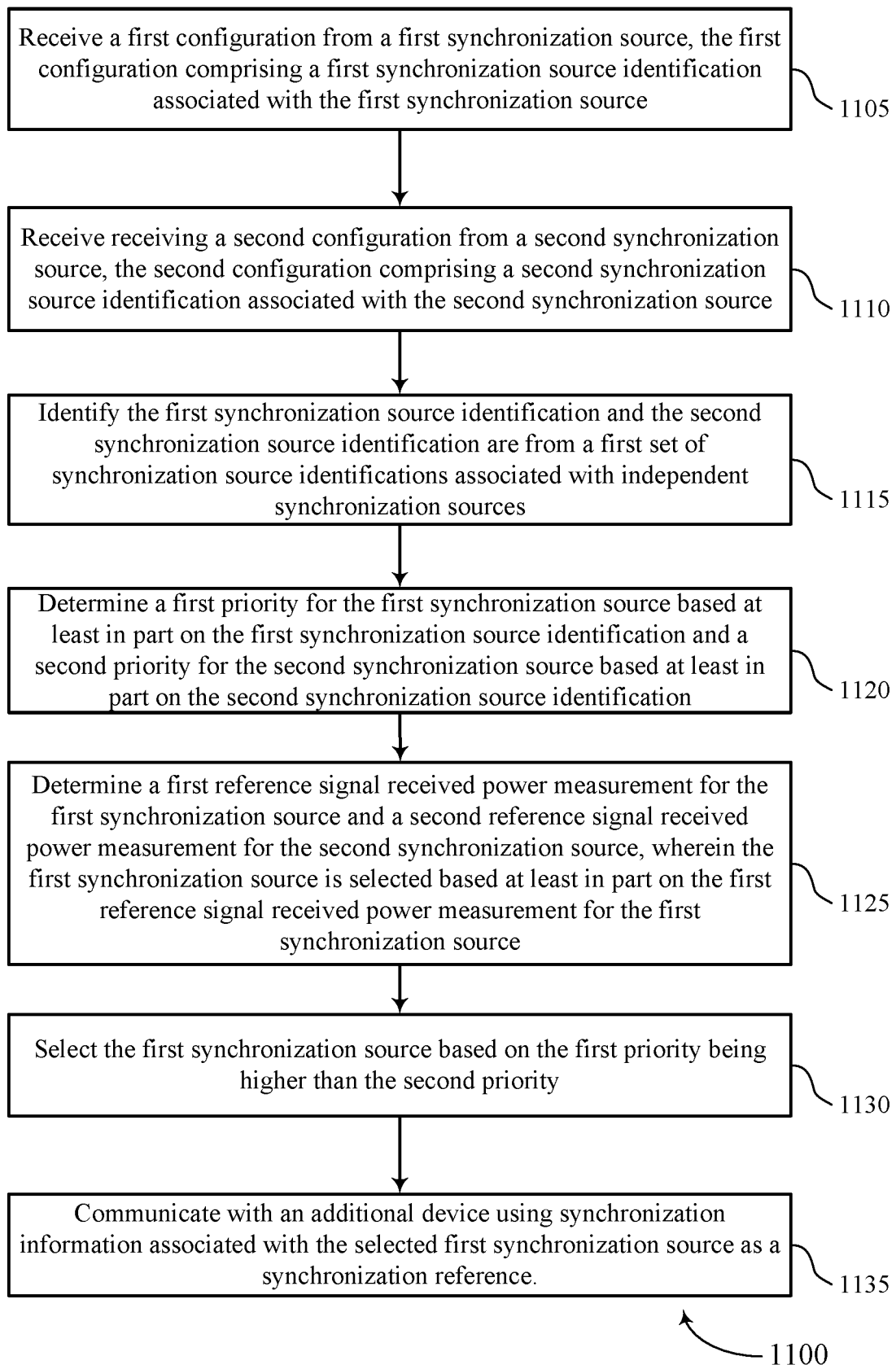

FIG. 11 shows a flowchart illustrating a method 1100 that supports techniques for synchronizing based on sidelink synchronization signal prioritization in accordance with aspects of the present disclosure. The operations of method 1100 may be implemented by a UE or its components as described herein. For example, the operations of method 1100 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may receive a first configuration from a first synchronization source, the first configuration including a first synchronization source ID associated with the first synchronization source. The operations of 1105 may be performed according to the methods described herein. In some examples, aspects of the operations of 1105 may be performed by a first synchronization source identifier as described with reference to FIGS. 6 through 9.

At 1110, the UE may receive a second configuration from a second synchronization source, the second configuration including a second synchronization source ID associated with the second synchronization source. The operations of 1110 may be performed according to the methods described herein. In some examples, aspects of the operations of 1110 may be performed by a second synchronization source identifier as described with reference to FIGS. 6 through 9.

At 1115, the UE may identify the first synchronization source ID and the second synchronization source ID are from a first set of synchronization source IDs associated with independent synchronization sources. The operations of 1115 may be performed according to the methods described herein. In some examples, aspects of the operations of 1115 may be performed by an independent synchronization source component as described with reference to FIGS. 6 through 9.

At 1120, the UE may determine a first priority for the first synchronization source based on the first synchronization source ID and a second priority for the second synchronization source based on the second synchronization source ID. The operations of 1120 may be performed according to the methods described herein. In some examples, aspects of the operations of 1120 may be performed by a synchronization source priority component as described with reference to FIGS. 6 through 9.

At 1125, the UE may determine a first RSRP measurement (e.g., or similar power measurement) for the first synchronization source and a second RSRP measurement (e.g., or similar power measurement) for the second synchronization source, where the first synchronization source is selected based on the first RSRP measurement for the first synchronization source. The operations of 1125 may be performed according to the methods described herein. In some examples, aspects of the operations of 1125 may be performed by a RSRP determination component as described with reference to FIGS. 6 through 9.

At 1130, the UE may select the first synchronization source based on the first priority being higher than the second priority. The operations of 1130 may be performed according to the methods described herein. In some examples, aspects of the operations of 1130 may be performed by a synchronization source selector as described with reference to FIGS. 6 through 9.

At 1135, the UE may communicate with one or more devices using synchronization information associated with the selected first synchronization source as a synchronization reference. The operations of 1135 may be performed according to the methods described herein. In some examples, aspects of the operations of 1135 may be performed by a synchronous communicator as described with reference to FIGS. 6 through 9.

Figure 12:
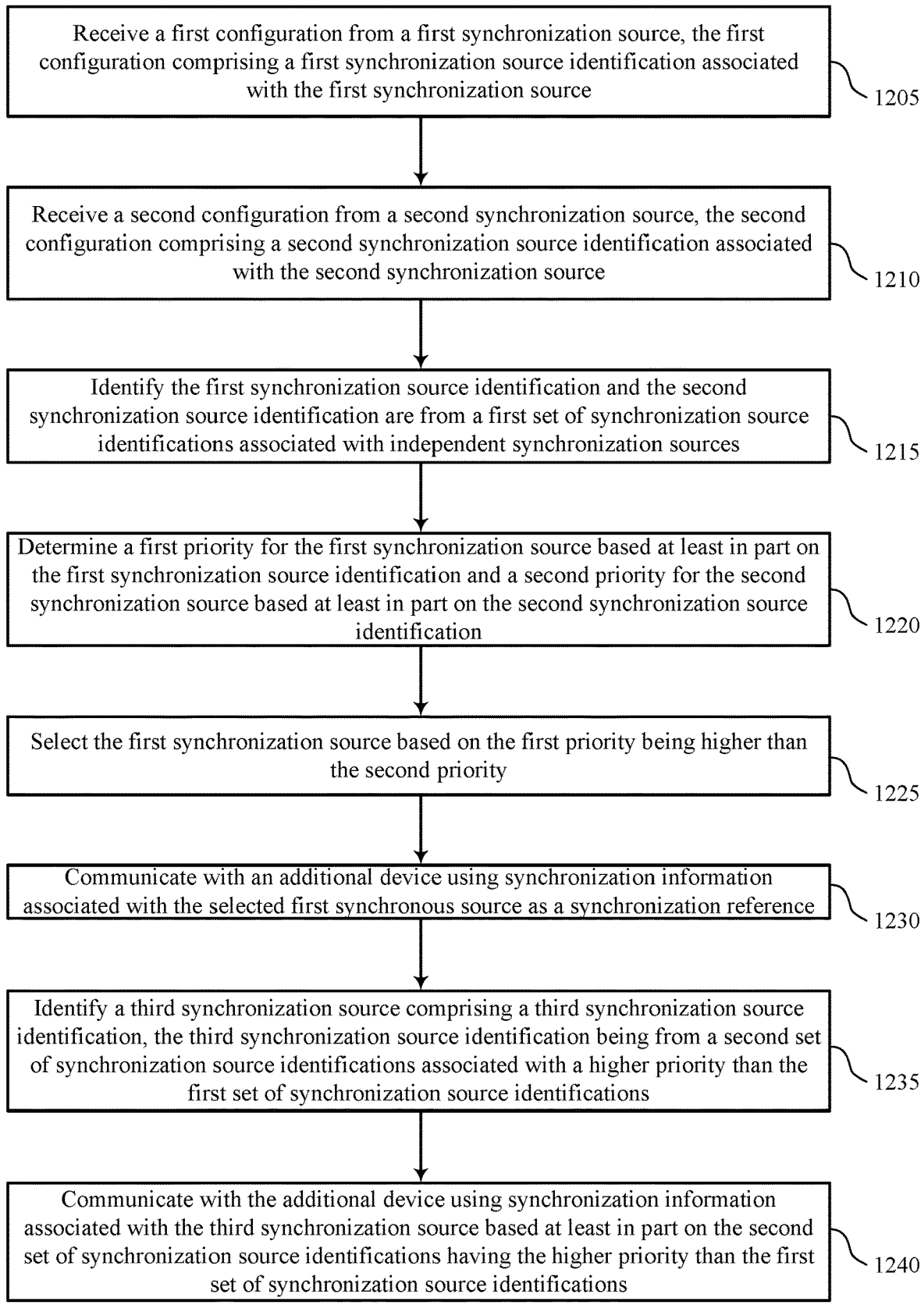

FIG. 12 shows a flowchart illustrating a method 1200 that supports techniques for synchronizing based on sidelink synchronization signal prioritization in accordance with aspects of the present disclosure. The operations of method 1200 may be implemented by a UE or its components as described herein. For example, the operations of method 1200 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may receive a first configuration from a first synchronization source, the first configuration including a first synchronization source ID associated with the first synchronization source. The operations of 1205 may be performed according to the methods described herein. In some examples, aspects of the operations of 1205 may be performed by a first synchronization source identifier as described with reference to FIGS. 6 through 9.

At 1210, the UE may receive a second configuration from a second synchronization source, the second configuration including a second synchronization source ID associated with the second synchronization source. The operations of 1210 may be performed according to the methods described herein. In some examples, aspects of the operations of 1210 may be performed by a second synchronization source identifier as described with reference to FIGS. 6 through 9.

At 1215, the UE may identify the first synchronization source ID and the second synchronization source ID are from a first set of synchronization source IDs associated with independent synchronization sources. The operations of 1215 may be performed according to the methods described herein. In some examples, aspects of the operations of 1215 may be performed by an independent synchronization source component as described with reference to FIGS. 6 through 9.

At 1220, the UE may determine a first priority for the first synchronization source based on the first synchronization source ID and a second priority for the second synchronization source based on the second synchronization source ID. The operations of 1220 may be performed according to the methods described herein. In some examples, aspects of the operations of 1220 may be performed by a synchronization source priority component as described with reference to FIGS. 6 through 9.

At 1225, the UE may select the first synchronization source based on the first priority being higher than the second priority. The operations of 1225 may be performed according to the methods described herein. In some examples, aspects of the operations of 1225 may be performed by a synchronization source selector as described with reference to FIGS. 6 through 9.

At 1230, the UE may communicate with one or more devices using synchronization information associated with the selected first synchronization source as a synchronization reference. The operations of 1230 may be performed according to the methods described herein. In some examples, aspects of the operations of 1230 may be performed by a synchronous communicator as described with reference to FIGS. 6 through 9.

At 1235, the UE may identify a third synchronization source including a third synchronization source ID, the third synchronization source ID being from a second set of synchronization source IDs associated with a higher priority (e.g., within a GNSS coverage) than the first set of synchronization source IDs. The operations of 1235 may be performed according to the methods described herein. In some examples, aspects of the operations of 1235 may be performed by a GNSS synchronization source communicator as described with reference to FIGS. 6 through 9.

At 1240, the UE may communicate with the one or more devices using synchronization information associated with the third synchronization source based on the second set of synchronization source IDs having the higher priority than the first set of synchronization source IDs. The operations of 1240 may be performed according to the methods described herein. In some examples, aspects of the operations of 1240 may be performed by a GNSS synchronization source communicator as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a first configuration from a first synchronization source, the first configuration comprising a first synchronization source identification associated with the first synchronization source;
   receiving a second configuration from a second synchronization source, the second configuration comprising a second synchronization source identification associated with the second synchronization source,
   identifying the first synchronization source identification and the second synchronization source identification are from a first set of synchronization source identifications associated with independent synchronization sources, selecting the first synchronization source based at least in part on determining a first priority associated with the first synchronization source is higher than a second priority associated with the second synchronization source, wherein determining the first priority is higher than the second priority is based at least in part on a comparison of a value of the first synchronization source identification and a value of the second synchronization source identification; and communicating with one or more devices using synchronization information associated with the selected first synchronization source as a synchronization reference.

2. The method of claim 1, wherein determining the first priority is higher than the second priority is based at least in part on the value of the first synchronization source identification being lower than the value of the second synchronization source identification.

3. The method of claim 1, wherein the first synchronization source identification has a same value as the second synchronization source identification, the method further comprising:

determining a first reference signal received power measurement for the first synchronization source and a second reference signal received power measurement for the second synchronization source, wherein the first synchronization source is selected based at least in part on the first reference signal received power measurement for the first synchronization source.

4. The method of claim 1, wherein the first priority and the second priority are determined based at least in part on priority groups within the first set of synchronization source identifications associated with the independent synchronization sources.

5. The method of claim 4, further comprising:
receiving, via radio resource control signaling, an indication of the priority groups.

6. The method of claim 1, further comprising:
determining a first reference signal received power measurement for the first synchronization source and a second reference signal received power measurement for the second synchronization source, wherein the first synchronization source is selected based at least in part on the first reference signal received power measurement for the first synchronization source.

7. The method of claim 1, further comprising:
receiving the second configuration from the second synchronization source;
identifying the second synchronization source identification has a higher priority than the first synchronization source identification; and
transitioning communications with the one or more devices from using the synchronization information associated with the selected first synchronization source to using synchronization information associated with the second synchronization source based at least in part on the higher priority of the second synchronization source identification.

8. The method of claim 1, further comprising:
identifying a third synchronization source comprising a third synchronization source identification, the third synchronization source identification being from a second set of synchronization source identifications associated with a higher priority than the first set of synchronization source identifications; and communicating with the one or more devices using synchronization information associated with the third synchronization source based at least in part on the second set of synchronization source identifications having the higher priority than the first set of synchronization source identifications.

9. The method of claim 8, wherein the second set of synchronization source identifications are associated with a global navigation satellite system coverage.

10. The method of claim 1, wherein the first synchronization source comprises a first UE and the second synchronization source comprises a second UE.

11. The method of claim 1, wherein the communications with the one or more devices comprise sidelink communications, and the first configuration is received over a sidelink with the first synchronization source and the second synchronization configuration is received over a sidelink with the second synchronization source.

12. An apparatus for wireless communications at a user equipment (UE), comprising:
a processor,
memory coupled with the processor; and
instructions stored in the memory and executable by the processor to cause the apparatus to:
receive a first configuration from a first synchronization source, the first configuration comprising a first synchronization source identification associated with the first synchronization source;
receive a second configuration from a second synchronization source, the second configuration comprising a second synchronization source identification associated with the second synchronization source;
identify the first synchronization source identification and the second synchronization source identification are from a first set of synchronization source identifications associated with independent synchronization sources;
select the first synchronization source based at least in part on a first priority associated with the first synchronization source is higher than a second priority associated with the second synchronization source, wherein determining the first priority is higher than the second priority is based at least in part on a comparison of a value of the first synchronization source identification and a value of the second synchronization source identification; and
communicate with one or more devices using synchronization information associated with the selected first synchronization source as a synchronization reference.

13. The apparatus of claim 12, wherein determining the first priority is higher than the second priority is based at least in part on the value of the first synchronization source identification being lower than the value of the second synchronization source identification.

14. The apparatus of claim 12, wherein the first synchronization source identification has a same value as the second synchronization source identification, the instructions are further executable by the processor to cause the apparatus to:
determining a first reference signal received power measurement for the first synchronization source and a second reference signal received power measurement for the second synchronization source, wherein the first synchronization source is selected based at least in part on the first reference signal received power measurement for the first synchronization source.

15. The apparatus of claim 12, wherein the first priority and the second priority are determined based at least in part on priority groups within the first set of synchronization source identifications associated with the independent synchronization sources.

16. The apparatus of claim 15, wherein the instructions are further executable by the processor to cause the apparatus to:
receive, via radio resource control signaling, an indication of the priority groups.

17. The apparatus of claim 12, wherein the instructions are further executable by the processor to cause the apparatus to:
determine a first reference signal received power measurement for the first synchronization source and a second reference signal received power measurement for the second synchronization source, wherein the first synchronization source is selected based at least in part on the first reference signal received power measurement for the first synchronization source.

18. The apparatus of claim 12, wherein the instructions are further executable by the processor to cause the apparatus to:
receive the second configuration from the second synchronization source;
identify the second synchronization source identification has a higher priority than the first synchronization source identification; and
transition communications with the one or more devices from using the synchronization information associated with the selected first synchronization source to using synchronization information associated with the second synchronization source based at least in part on the higher priority of the second synchronization source identification.

19. The apparatus of claim 12, wherein the instructions are further executable by the processor to cause the apparatus to:
identify a third synchronization source comprising a third synchronization source identification, the third synchronization source identification being from a second set of synchronization source identifications associated with a higher priority than the first set of synchronization source identifications; and
communicate with the one or more devices using synchronization information associated with the third synchronization source based at least in part on the second set of synchronization source identifications having the higher priority than the first set of synchronization source identifications.

20. The apparatus of claim 19, wherein the second set of synchronization source identifications are associated with a global navigation satellite system coverage.

21. The apparatus of claim 12, wherein the first synchronization source comprises a first UE and the second synchronization source comprises a second UE.

22. The apparatus of claim 12, wherein the communications with the one or more devices comprise sidelink communications, and the first configuration is received over a sidelink with the first synchronization source and the second synchronization configuration is received over a sidelink with the second synchronization source.

23. An apparatus for wireless communications at a user equipment (UE), comprising:
means for receiving a first configuration from a first synchronization source, the first configuration comprising a first synchronization source identification associated with the first synchronization source;
means for receiving a second configuration from a second synchronization source, the second configuration comprising a second synchronization source identification associated with the second synchronization source;
means for identifying the first synchronization source identification and the second synchronization source identification are from a first set of synchronization source identifications associated with independent synchronization sources;
means for selecting the first synchronization source based at least in part on a first priority associated with the first synchronization source is higher than the second priority associated with the second synchronization source, wherein determining the first priority is higher than the second priority is based at least in part on a comparison of a value of the first synchronization source identification and a value of the second synchronization source identification; and
means for communicating with one or more devices using synchronization information associated with the selected first synchronization source as a synchronization reference.

24. The apparatus of claim 23, wherein determining the first priority is higher than the second priority based at least in part on the value of the first synchronization source identification being lower than the value of the second synchronization source identification.

25. The apparatus of claim 23, wherein the first synchronization source identification has a same value as the second synchronization source identification, the apparatus further comprising:
means for determining a first reference signal received power measurement for the first synchronization source and a second reference signal received power measurement for the second synchronization source, wherein the first synchronization source is selected based at least in part on the first reference signal received power measurement for the first synchronization source.

26. The apparatus of claim 23, wherein the first priority and the second priority are determined based at least in part on priority groups within the first set of synchronization source identifications associated with the independent synchronization sources.

27. A non-transitory computer-readable medium storing code for wireless communications at a user equipment (UE), the code comprising instructions executable by a processor to:
receive a first configuration from a first synchronization source, the first configuration comprising a first synchronization source identification associated with the first synchronization source;
receive a second configuration from a second synchronization source, the second configuration comprising a second synchronization source identification associated with the second synchronization source;
identify the first synchronization source identification and the second synchronization source identification are from a first set of synchronization source identifications associated with independent synchronization sources;
select the first synchronization source based at least in part on determining a first priority associated with the first synchronization source is higher than the second priority associated with the second synchronization source, wherein determining the first priority is higher than the second priority is based at least in part on a comparison of a value of the first synchronization source identification and a value of the second synchronization source identification; and communicate with one or more devices using synchronization information associated with the selected first synchronization source as a synchronization reference.

28. The method of claim 1, wherein the independent synchronization sources associated with the first set of synchronization source identifications comprise synchronization sources out of a global navigation satellite system coverage, not connected to a base station, independent of the synchronization reference, or a combination thereof.

29. The apparatus of claim 12, wherein the independent synchronization sources associated with the first set of synchronization source identifications comprise synchronization sources out of a global navigation satellite system coverage, not connected to a base station, independent of the synchronization reference, or a combination thereof.

30. The apparatus of claim 23, wherein the independent synchronization sources associated with the first set of synchronization source identifications comprise synchronization sources out of a global navigation satellite system coverage, not connected to a base station, independent of the synchronization reference, or a combination thereof.

* * * * *